United States Patent [19]

Janssen

[11] 4,390,753
[45] Jun. 28, 1983

[54] LINE INTERRUPTION ARRANGEMENT

[75] Inventor: Daniël J. G. Janssen, Eindhoven, Netherlands

[73] Assignee: U.S. Philips Corporation, New York, N.Y.

[21] Appl. No.: 234,087

[22] Filed: Feb. 13, 1981

[30] Foreign Application Priority Data

Feb. 26, 1980 [NL] Netherlands .................. 8001135

[51] Int. Cl.³ ........................................... H04M 1/31
[52] U.S. Cl. ................................. 179/81 R; 179/90 R
[58] Field of Search ............... 179/81 R, 81 A, 90 R, 179/90 A, 16 EC, 81 B, 81 C, 81 D, 81 E, 90 AD, 90 AT, 90 AN, 90 B, 90 BB, 90 BD, 90 CS, 90 FW, 90 K, 90 L, 90 D, 84 R

[56] References Cited

U.S. PATENT DOCUMENTS 3,906,167  9/1975  Baker ................................ 179/81 R
4,306,119  12/1981  Kutzavitch ................... 179/81 R X Primary Examiner—G. Z. Rubinson
Assistant Examiner—W. J. Brady
Attorney, Agent, or Firm—Thomas A. Briody; William J. Streeter; Laurence A. Wright

[57]  ABSTRACT

Telephone subscriber's line interruption arrangement comprising a series arrangement of a semiconductor interrupter contact and a control circuit connected between a first line terminal and a second line terminal, in which a subscriber's line can be connected to the line terminals and via a hook contact. In order to ensure that at low line currents, that is to say in the case of long to very long subscriber's lines, the voltage drop across the interrupter contact is kept very low, the control circuit comprises an output circuit which ensures that the voltage at the control electrode of the semiconductor interrupter contact is at least equal to the voltage at the first terminal.

8 Claims, 2 Drawing Figures

LINE INTERRUPTION ARRANGEMENT

The invention relates to a line interruption arrangement for producing electronically generated dial pulses in a telephone set, comprising a first semiconductor switching element having a main current path and a control electrode, and a control circuit for generating the dial pulses, the control circuit having supply terminals and an output terminal, the main current path of the switching element being connected in series with the supply terminals of the control circuit between first and second line terminals and the output terminal of the control circuit being coupled to the control electrode of the semiconductor switching element for rendering the main current path semiconductor switching element conductive and non-conductive in response to the absence presence or of control pulses.

BACKGROUND OF THE INVENTION

Such an arrangement is disclosed in U.K. patent specification No. 1,404,078, from which it is known to replace the mechanical interrupter contact present in a dial by an electronic interrupter contact. It is then important that the electronic interrupter contact closely approaches the properties of the mechanical interrupter contact.

It is of particular important that the value of the resistance of the contact is very large in the opened condition and very small in the closed condition.

The value of the resistance in the open as well as in the closed condition is determined not only by the choice of the element but also by the circuit into which the contact is incorporated.

Applicants found that with the line interruption arrangement known from the above-mentioned United Kingdom Patent Specification the problem is encountered that the voltage drop across the electronic interrupter contact is not sufficiently small for low line currents, such as those in very long subscriber's lines. A low voltage drop across the switching contact is a particular requirement for a long subscriber's line in order that the supply voltage to the remaining equipment is sufficient.

This undesired voltage drop is caused by the fact that the control energy of the electronic interrupter contact decreases in response to a decreasing line current causing the voltage drop across the contact increases.

OBJECT OF THE INVENTION

It is an object of the invention to extend the operating range of the line interruption device defined in the opening paragraph to lower line currents.

SUMMARY OF THE INVENTION

According to the invention, the line interruption arrangement defined in the opening paragraph is characterized in that the control device comprises an output circuit which makes the potential of the control electrode at least equal to the potential of the first line terminal which first line terminal is directly connected to the main current path of the semiconductor switching element.

BRIEF DESCRIPTION OF THE DRAWINGS

The invention and its advantages will be further explained by way of example with reference to the embodiments shown in the drawings, corresponding elements having been given the same reference numerals.

DETAILED DESCRIPTION OF THE PREFERRED EMBODIMENTS

Figure 1:
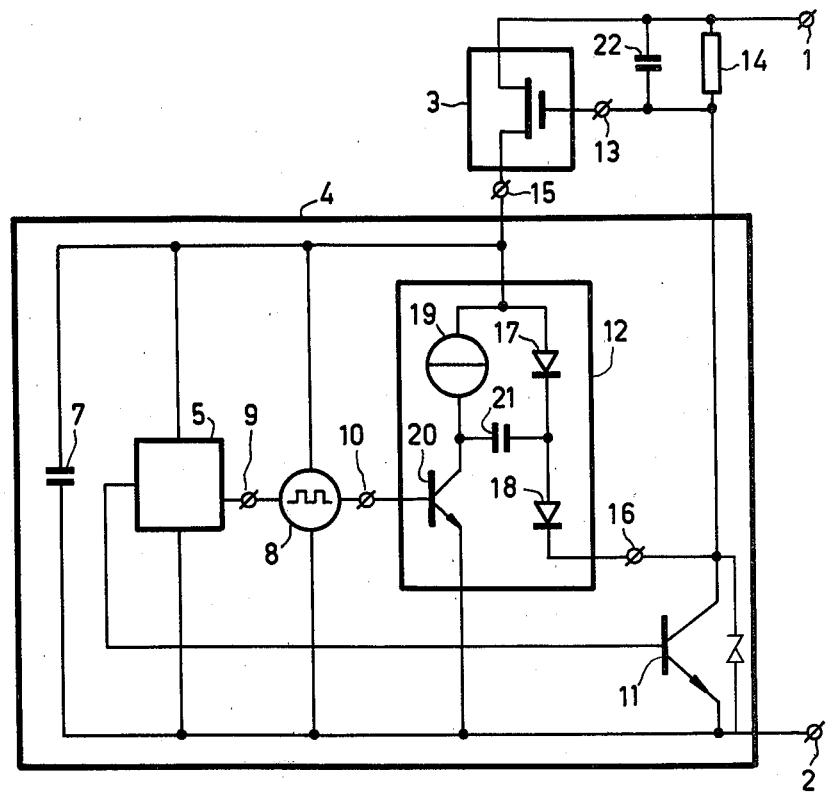
FIG. 1 shows a line interruption arrangement according to the invention.

The line interruption arrangement shown in FIG. 1 has two line terminals 1 and 2 for connecting subscriber's line via a hook contact. The line interruption arrangement is optionally connected to the line terminals via a rectifier circuit for applying, independent of the polarity on the subscriber's line, a supply current to a telephone set connected to the line terminals. The Figure shows only the interrupter contact 3 with the associated control circuit 4 of this subscriber's set.

The dial pulse contact 3 is in the form of a semiconductor switching element provided with a control electrode 13 and is connected in series with the control circuit 4 between the terminals 1 and 2 via connecting point 15. The control circuit 4 is provided with inter alia a dial pulse generator 5, a clock pulse generator 8 having a frequency which is high compared with the dial pulse frequency and a third transistor 11 for controlling the contact 3. The output 9 of the clock pulse generator 8 is connected to the dial pulse generator 5 for applying clock pulses from which the generator 5 generates control pulses. The main current path of the transistor 11 is connected between the second terminal 2 and the control electrode 13 of the electronic interrupter contact, the control electrode 13 being connected to the first terminal 1 via a resistor 14.

The control electrode of transistor 11 is connected to an output of the dial pulse generator 5.

The operation of the line interruption arrangement disclosed so far is extensively described in U.K. patent specification No. 1,404,708 and is briefly explained in the following description.

When in response to the closing of the hook contact, not shown, a voltage is connected between the terminals 1 and 2 via the subscriber's line a current will flow from the first terminal 1 through resistor 14, control electrodes 13, connecting point 15 and the control circuit 4 to the second terminal 2. This current causes the electronic interrupter contact 3 to assume the conductive state.

When the contact 3 is in the conductive state the clock pulse generator 8 and the dial pulse generator 5 are operative.

Usually, the dial pulse generator applies a low output voltage to the control electrode of transistor 11 so that this transistor is in the non-conductive state.

A digit selected which is chosen by means of a dial or a push-button switch, not shown, is applied by the dial pulse generator to the control electrode of transistor 11 in the form of a series of control pulses. For the pulse duration of each pulse the pulse generator 5 applies a high voltage to the control electrode of transistor 11 so that the latter is rendered conductive.

In the conductive state of transistor 11 the control electrode 13 of the electronic interrupter contact 3 is short-circuited to the terminal 2. The interrupter contact is then in the non-conductive state and the subscriber's line is interrupted. A capacitor 7, which is connected between the connecting point 15 and the terminal 2 and which is charged when the interrupter contact is closed is provided in the control circuit to provide a supply voltage when the interrupter contact is open.

It should be noted that for an interrupter contact which is in the form of a semiconductor element having a positive threshold voltage a circuit which short-circuits the control electrode 13 to the connecting point 15 during the transmission of dial pulses may alternatively be used instead of transistor 11.

From the above description it will apparent that the minimum voltage across the interrupter contact is equal to the voltage determined by the electronic interrupter contact between the control electrode 13 and the connecting point 15, plus the voltage drop across the resistor 14.

For short subscriber's lines and subscriber's lines of medium length this voltage drop across the interrupter contact 3 gives no problems as sufficient supply voltage for the control circuit 4 and the other circuits, arranged in parallel therewith, of a telephone set is still always present between the connecting point 15 and the terminal 2.

For long to very long subscriber's lines the available voltage across the control circuit and the telephone set connected in parallel therewith decreases and the minimum supply voltage is no longer available for very long line lengths.

The proper operation of the telephone set inclusive of the control circuit is endangered with these long subscriber's lines. To obviate this, the control circuit 5 comprises an output circuit 12 which produces a potential at the control electrode 13 at least equal to the potential on terminal 1.

This output circuit 12 can be realized in many ways. One possibility is, for example, for this circuit to comprise an oscillator, the output voltage of which is rectified. In this embodiment it comprises, however, a switched-mode amplifier 12 which is connected between the connecting point 15 and the second terminal 2 and whose output 16 is connected to the control electrode 13 of the interrupter contact 3.

From the supply voltage present between the point 15 and terminal 2 this switched-mode voltage amplifier generates a control voltage at its output terminal 16 which is at least equal to the voltage at the first terminal 1.

The result is that the electronic interrupter contact 3 can always be driven into saturation for the time during which a sufficient supply voltage is present between the terminals 1 and 2 for the proper operation of the control device. Neglecting a very small voltage drop across the electronic interrupter contact 3, when this has been driven to saturation the supply voltage is equal to the minimum supply voltage of the switched-mode amplifier 12. As a result of this the usability of the telephone set has been extended to the range of very long subscriber's lines.

Preferably, the electronic interrupter contact comprises a V-MOS transistor; however, other types of transistors such as bipolar transistors may alternatively be used.

In order to generate the said control voltage from the voltage present between connecting point 15 and terminal 2 the switched-mode amplifier 12 comprises a voltage doubler circuit in the form of two series-arranged diodes 17 and 18 connected between connecting point 15 and output 16, a series arrangement of a current source 19 and the main current path of a second semiconductor switching element, in the form of a transistor 20, whose control electrode is connected to a second output 10 of the clock pulse generator 8, this series arrangement being connected between connecting point 15 and terminal 2, and a capacitor 21 connected between the junction of the diodes 17 and 18 and the junction of current source 19 and transistor 20. The switched-mode amplifier 12 operates as follows.

During a clock pulse produced by the clock pulse generator 8 the switching transistor 20 is in the conductive state. The capacitor 21 is then charged by a charging current flowing from terminal 1, via the electronic interrupter contact 3, connecting point 15, diode 17, capacitor 21 and switching transistor 20 to terminal 2.

This current charges the capacitor 21 to a voltage equal to the voltage between the line terminals 1 and 2 reduced by the voltage drop across the interrupter contact 3, diode 17 and switching transistor 20.

During the interval between two consecutive pulses, from the clock pulse generator 8 the switching transistor 20 is in the non-conducting state. The potential of the plate of the capacitor connected to the current source 19 then rises to the potential of the connecting point 15. The voltage at the other plate of the capacitor then increases to the sum of the said voltages causing the diode 17 to be cutoff and the diode 18 to become conductive.

The voltage at connecting point 16 which is preferably some volts higher than the voltage at terminal 1 is applied to control electrode 13 and drives the electronic interrupter contact to saturation. In order to ensure that when the transistor 20 is conductive a control voltage is still present at the control electrode 13 the resistor 14 is shunted by a capacitor 22. The capacitor 22 also produces the sensitivity of the interrupter contact to noise voltages.

A bipolar transistor may be used as the interrupter contact 3. Using a V-MOS transistor as the electronic interrupter 3 furnishes the advantage that little control energy is required. In combination with a high clock frequency this causes the dissipation of the switched-mode amplifier to be very small and capacitors 21 and 22 may be of a low value, in combination with a resistor 14 of a very high value. This has the further important advantage that the interrupter contact 3 can be switched very rapidly from the saturated, closed condition to the cut-off, open condition and vice versa.

It should further be noted that a resistor may alternatively be used instead of the current source 19. Moreover a zener diode (not shown in the Figure) can be connected between the control electrode 13 of the interrupter contact 3 and the second terminal 2 for the protection of the arrangement against over voltages induced on the subscriber line.

Figure 2:
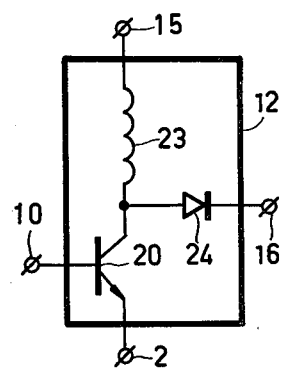
FIG. 2 shows an alternative output circuit for use in a line interruption arrangement as shown in FIG. 1.

FIG. 2 shows an alternative embodiment of a switched-mode amplifier 12 which is suitable for the properties of the control electrode of a bipolar transistor. This switched-mode amplifier 12 is therefore preferably used when the electronic interrupter contact 3 comprises a bipolar transistor.

In order to obtain a voltage at terminal 16 which is higher than the voltage at connecting point 15 this switched-mode amplifier comprises in addition to the switching transistor 20 described in the foregoing, a coil 23, connected between the connecting point 15 and the collector of the transistor 20 and a diode 24, connected between the said collector and the output terminal 16.

In the conductive state of transistor 20 a current flows through coil 23. In the cutoff state the coil 23 tries to maintain the current in the coil and consequently the voltage across the coil reverses its direction and is added to the voltage at connecting point 15. Diode 24 is then rendered conductive in response to which the desired high control voltage is applied to the bipolar transistor of the switching element 13 via output terminal 16.

What is claimed is:

1. A line interruption arrangement for producing electronically generated dial pulses in a telephone set comprising:

a first semiconductor switching element having a main current path and a control electrode, and a control circuit having supply terminals and an output terminal, the main current path of said first semiconductor switching element being connected in series with the supply terminals of said control circuit between first and second line terminals, the output terminal of said control circuit being coupled to said control electrode of said semiconductor switching element for rendering the main current path of the semiconductor switching element conductive and non-conductive in response to the absence or presence of control pulses, said control circuit further comprises an output circuit which makes the potential of the control electrode at least equal to the potential of said first line terminal which is directly connected to the main current path of said first semiconductor switching element.

2. A line interruption arrangement as claimed in claim 1 wherein said semiconductor switching element is a V-MOS type of transistor.

3. A line interruption arrangement as claimed in claim 1, wherein said output circuit comprises a switched-mode amplifier for generating a high potential from the potential difference across said control circuit, the output of said amplifier being connected to the output terminal of said control circuit.

4. A line interruption arrangement as claimed in claim 3, wherein said switched-mode amplifier comprises a series arrangement of two diodes connected between the junction of the supply terminal, the control circuit and the main current path of said first semiconductor switching element and the output terminal of the control circuit and a series arrangement of a high value resistor and a main current path of a second semiconductor switching element connected between said junction point and the second line terminal, a capacitor connected between the junction of said diodes and the junction of the high value resistor and said second semiconductor switching element and the control pulse is generated by a clock pulse generator connected to said control electrode of said second semiconductor element.

5. A line interruption arrangement as claimed in claim 4, wherein said high value resistor is the resistance of a current source.

6. A line interruption arrangement as claimed in claim 3, wherein said switched-mode amplifier comprises the series arrangement of a coil in the main current path of a second semiconductor switching element connected between the junction of the supply terminal of the control circuit and the main current path of the semiconductor switching element and the second line terminal, the control electrode of said second semiconductor switching element being connected to a clock pulse generator and the junction of the coil and the second switching element being connected to the output terminal via a diode.

7. A line interruption arrangement is claimed in claim 2, in which a second resistor is provided between the first line terminal and the control electrode of the first semiconductor switching element, and in which a zener diode is connected between the control electrode of said first switching element and said second line terminal.

8. A line interruption arrangement as claimed in claim 4, wherein said control circuit comprises a dial pulse generator and wherein the main current path of a third semiconductor switching element whose control electrode is connected to the dial pulse generator, is connected between the control electrode of said first switching element and said second line terminal.

* * * * *